United States Patent

[11] 3,578,089

| [72] | Inventors | Ronald J. Fischer<br>Wapakoneta;<br>Wilbur E. Groeneveld, Celina; Gerald O. Irvine, Coldwater, Ohio |
|---|---|---|
| [21] | Appl. No. | 796,459 |
| [22] | Filed | Feb. 4, 1969 |
| [45] | Patented | May 11, 1971 |
| [73] | Assignee | Avco Corporation<br>Coldwater, Ohio |

[54] ADJUSTABLE IMPLEMENT-CARRYING ASSEMBLY
7 Claims, 6 Drawing Figs.

[52] U.S. Cl. .................................................. 172/277,
172/484, 172/691, 172/679, 172/741, 172/776
[51] Int. Cl. ........................................ A01b 59/048,
A01b 63/32
[50] Field of Search .................................. 172/272,
273, 274, 276, 800, 277, 311, 312, 443, 446, 450,
451, 476, 679, 673, 691—693, 741, 763, 776, 456

[56] References Cited
UNITED STATES PATENTS

| 2,053,618 | 9/1936 | Legenore | 172/476X |
|---|---|---|---|
| 2,654,982 | 10/1953 | Edwards | 172/679X |
| 2,752,837 | 7/1956 | Parker | 172/273X |
| 2,889,890 | 6/1959 | Bronleewe | 172/776X |
| 2,958,383 | 11/1960 | Danielson | 172/456 |
| 3,022,836 | 2/1962 | Bechman | 172/763X |
| 3,312,290 | 4/1967 | Abbott | 172/451 |
| 3,330,364 | 7/1967 | Orthman | 172/451 |

FOREIGN PATENTS

| 158,559 | 8/1954 | Australia | 172/446 |

*Primary Examiner*—Robert E. Pulfrey
*Assistant Examiner*—Alan E. Kopecki
*Attorneys*—Charles M. Hogan and Gary M. Gron

ABSTRACT: The disclosure illustrates an implement-carrying assembly for use with a wheeled transport vehicle. A tool bar is secured to the forward end of the transport vehicle by a pair of laterally adjustable parallel lift linkages. Each of the parallel lift linkages has a provision for detachable mounting of a hydraulic actuator for raising and lowering the tool bar through a linkage arrangement connected to the lifting links. The lift linkages are laterally adjustable relative to one another and to the tool bar to facilitate the mounting of implements for various row spacings. The tool bar is stiffened by truss rods supported in such a manner that they provide support irrespective of the relative positions of the tool bar and the lifting linkages.

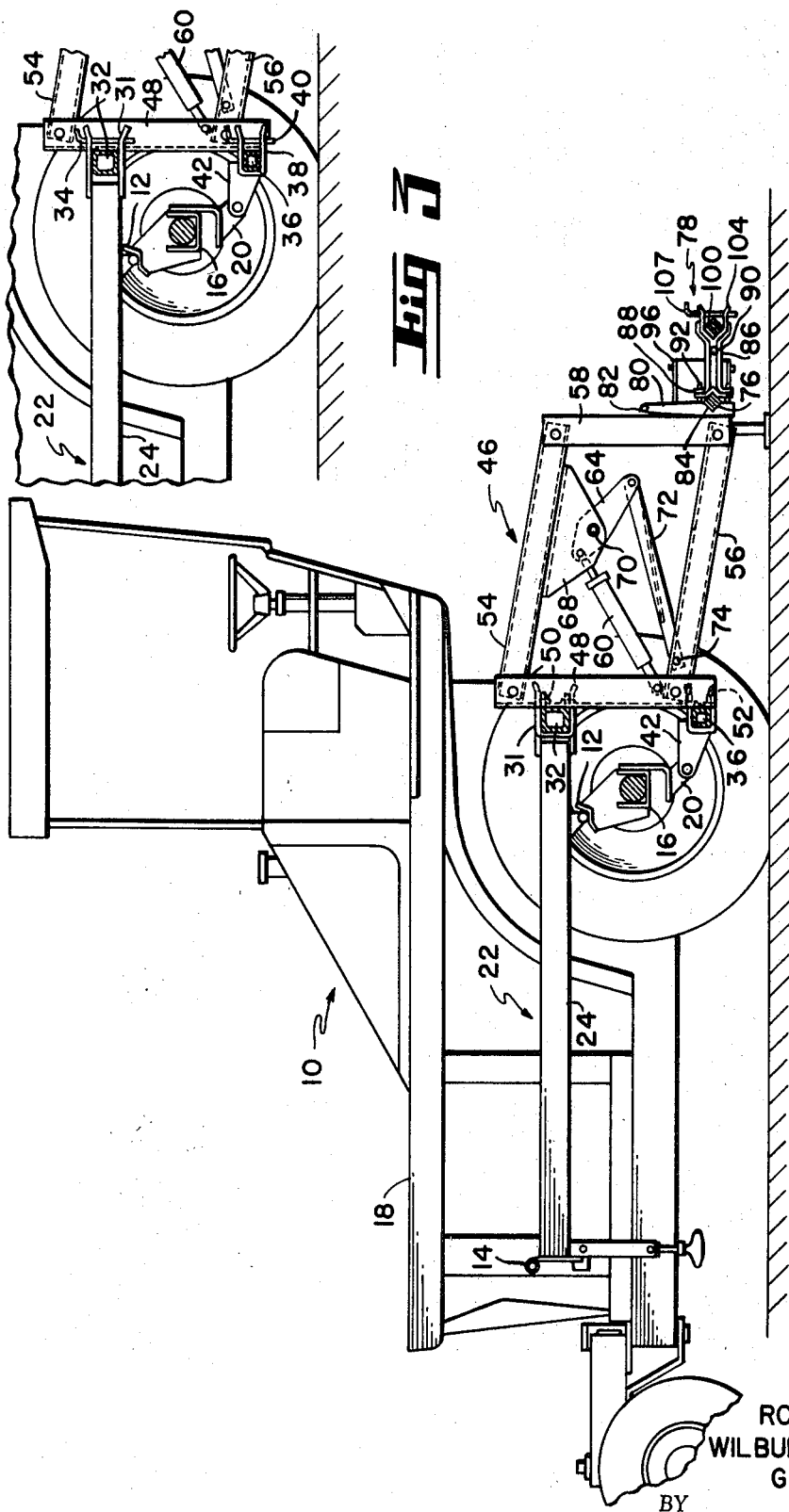

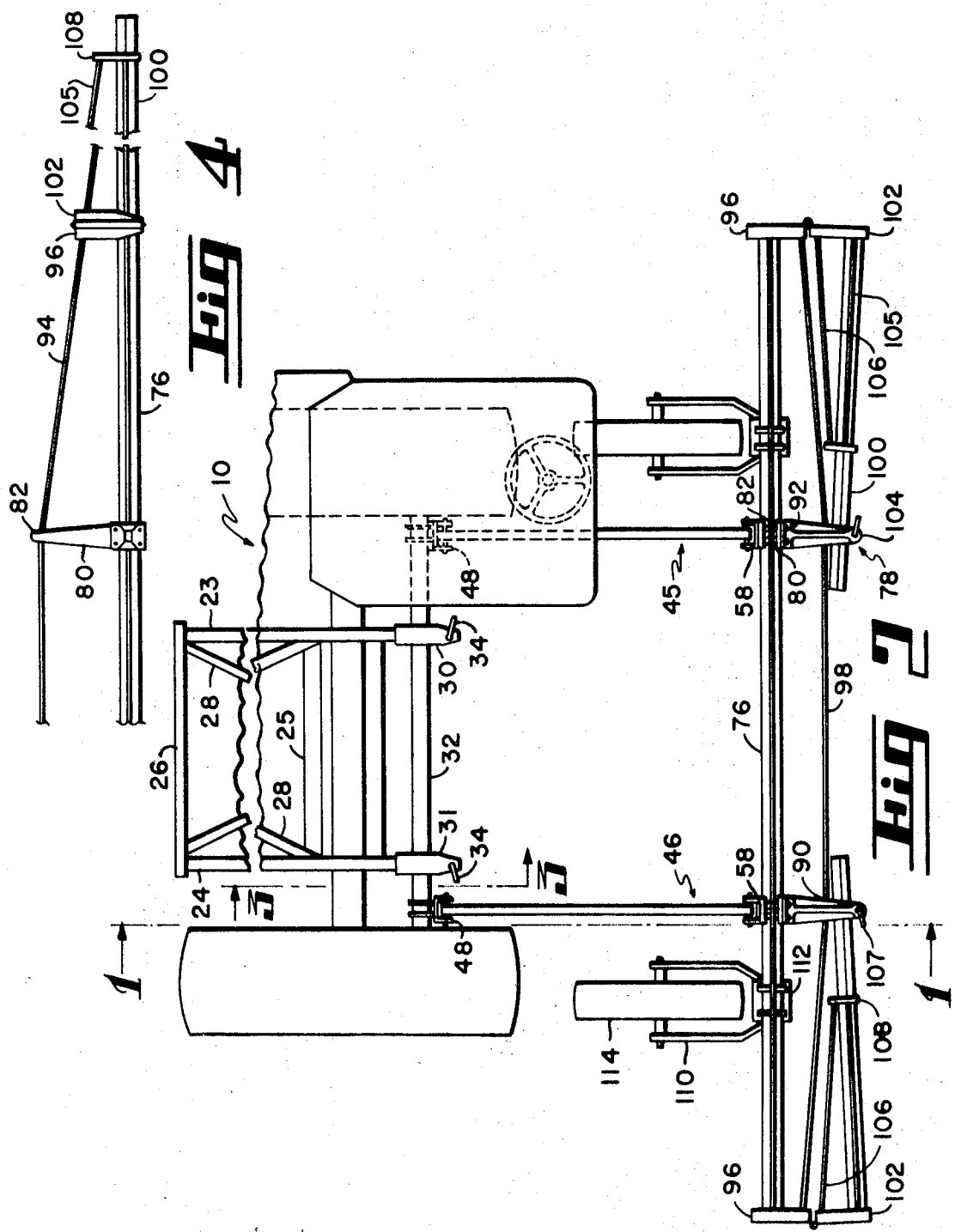

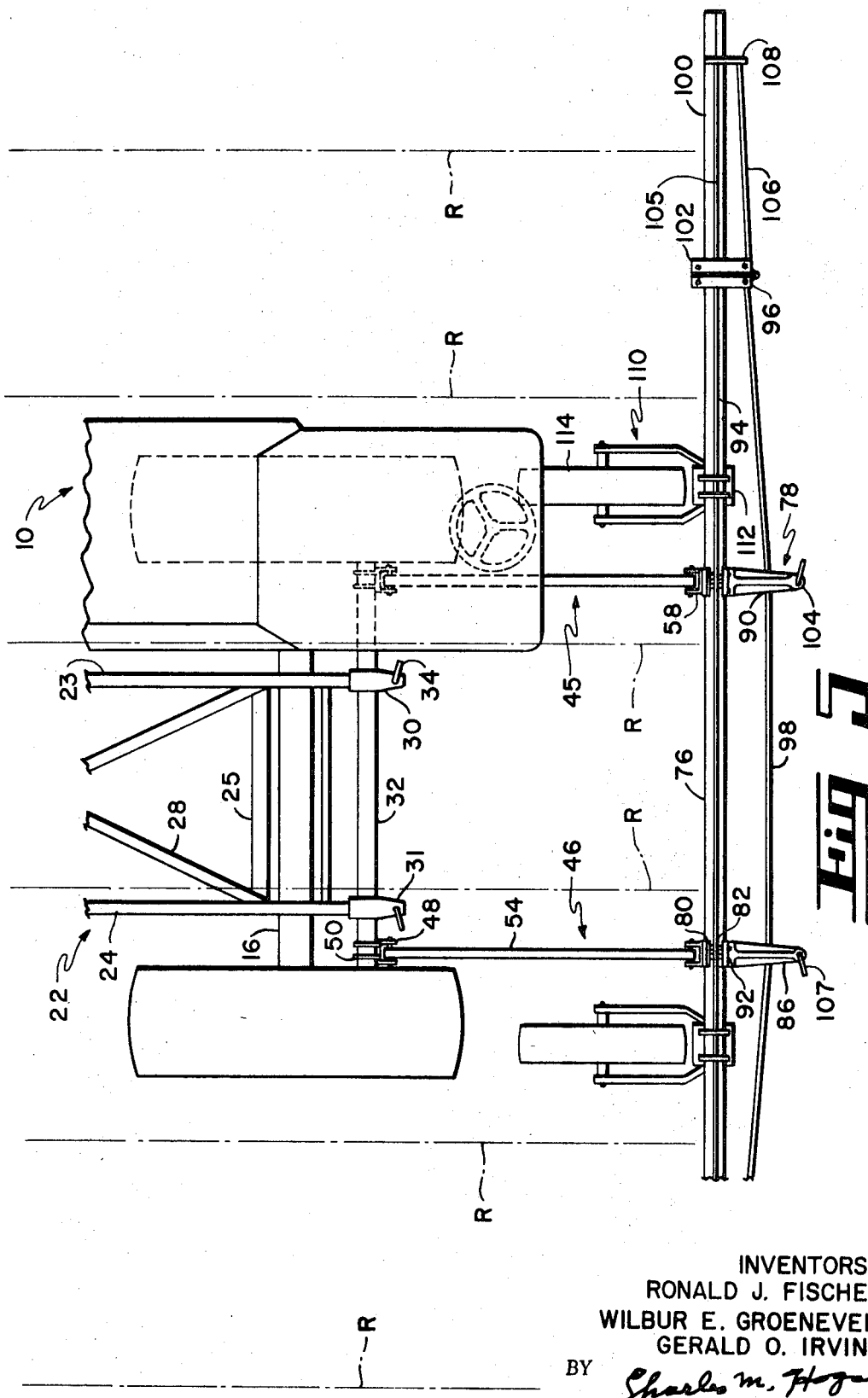

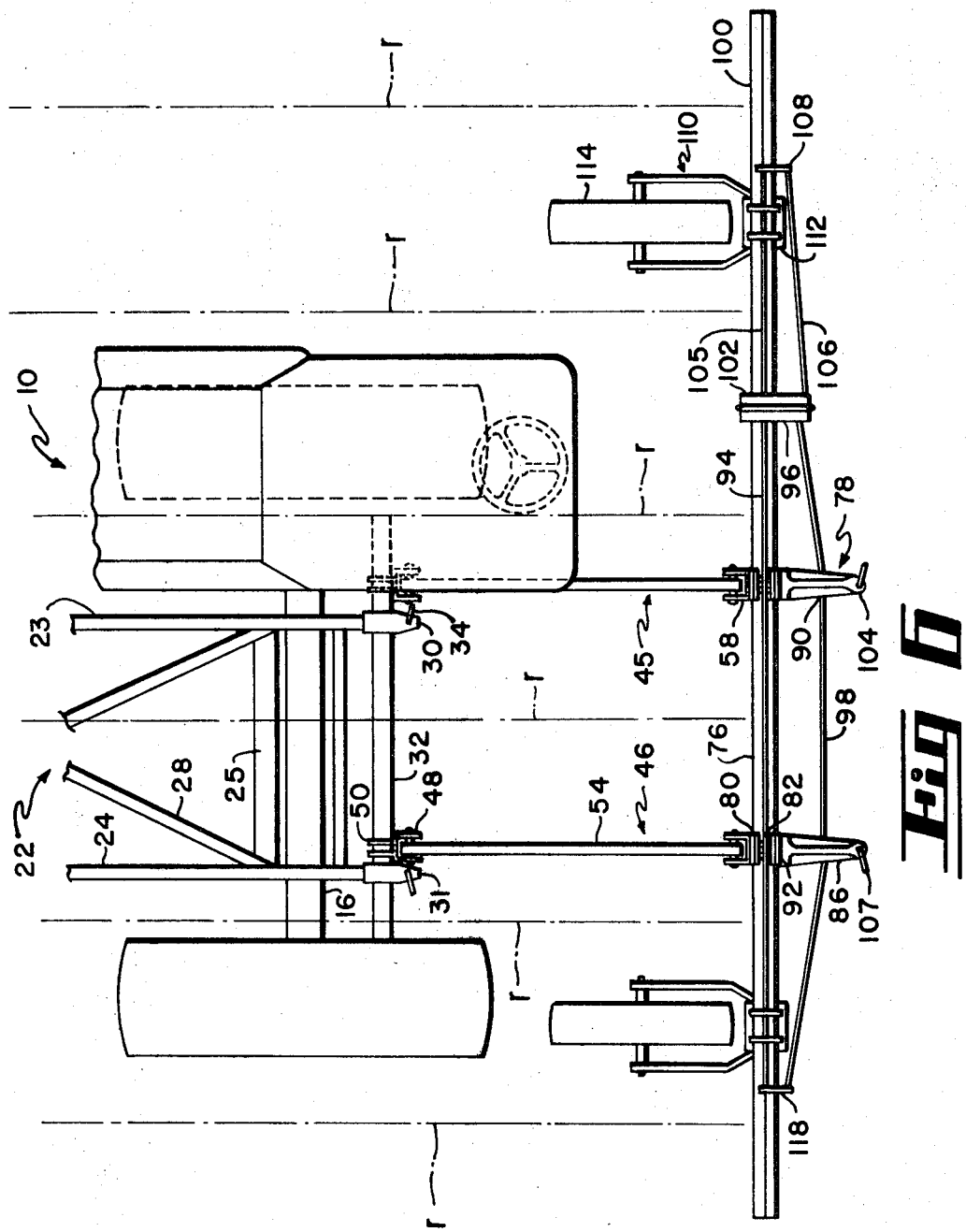

ADJUSTABLE IMPLEMENT-CARRYING ASSEMBLY

The present invention relates to implement-carrying assemblies and more particularly to assemblies of this type that are adjustable.

It is a recent practice to mount a transverse rigid bar on the forward end of a tractor or other propulsion vehicle to provide a spaced support for agricultural implements. This arrangement enables excellent operator visibility because the implements are forward of the vehicle. These implements are used, for example, to plant seeds in a given row-spacing arrangement in a field. Since the implements must be elevated above the ground when the end of a row is reached, a means is provided to lift the tool bar above the ground and to lower it into a working position.

While these tool-carrying assemblies have been generally effective, they do not have the flexibility to accommodate the recent practice of narrower row spacing while at the same time being able to be used for the wider row spacings. This problem arises because the lifting means is on the same side of the tool bar as the agricultural implements. Therefore, any lateral shifting of the implement is prevented by the lifting means. Furthermore, the maximum number of rows able to be accommodated is somewhat limited due to the tendency of the tool bar to bend when the free length is relatively long.

Accordingly, it is an object of the present invention to provide an implement-carrying assembly that has a high degree of flexibility in enabling a varying row spacing between implements carried by the assembly.

It is a further object of the present invention to provide an implement-carrying assembly that rigidly supports the implement-carrying member irrespective of its length.

In one aspect of the present invention, the above ends are achieved by providing an apparatus for mounting a transversely positioned implement-carrying member on a vehicle adapted for transport across a field. The implement-carrying member provides a support for ground-engaging implements in a given row-spacing arrangement. The apparatus comprises a support frame detachably mounted on the transport vehicle and including at least one transversely extending mounting member. A pair of spaced articulated parallel support linkages are each positioned in a longitudinal vertical plane and have a first vertical link adjacent said transverse mounting member and a second vertical link spaced from the said first link and displaceable parallel to the first link. A means is provided for laterally adjustably mounting the first vertical links to the transverse mounting member and for laterally adjustably securing the implement-carrying member to the second vertical link so that the spaced linkages extend from the mounting member in between the ground-engaging implements irrespective of the row-spacing arrangement between the implements.

In yet another aspect of the present invention, the above ends are achieved by an implement-carrying assembly for use with a vehicle adapted for transport across a field. The implement-carrying assembly comprises an elongated structural transverse bar extending laterally beyond the width of the transport vehicle. A means is provided for adjustably laterally supporting the transverse bar on the vehicle. A means is secured to the transverse bar for mounting the bar to the vehicle adjustable mounting means, the mounting means including at least one vertical rigid post for a means on the upper end for forming a transverse guide. A longitudinal truss rod is positioned above the transverse bar and is received in the guide of the vertical post. A means for securing the ends of the upper truss rod is provided adjacent the ends of the transverse bar. The mounting means is adapted to be laterally adjustably secured to the transverse bar and the guides on the vertical posts are adapted to slidably receive the truss rod so that the transverse bar is stiffened irrespective of the position of the transverse bar relative to the adjustable mounting means on the vehicle.

The above and other related objects and features of the present invention will be apparent from a reading of the description of the invention shown in the accompanying drawings and the novelty thereof pointed out in the appended claims.

In the drawings:

FIG. 1 is an elevational view of an implement-carrying assembly embodying the present invention and mounted on a transport vehicle;

FIG. 2 is a plan view of the implement-carrying assembly shown in FIG. 1;

FIG. 3 is a fragmentary view of the implement-carrying assembly of FIG. 1, taken on lines 3—3 of FIG. 2;

FIG. 4 is a frontal elevational view of a portion of the implement-carrying assembly of FIG. 1;

FIGS. 5 and 6 are simplified plan views of the implement-carrying assembly of the present invention, illustrating the adaptability of the implement-carrying assemblies to accommodate different row spacings between implements carried by the assembly.

Referring now to FIGS. 1 and 2, there is shown a transport vehicle 10 with which the present invention is used. The vehicle 10 is preferably of the type described in copending Pat. application Ser. No. 498,533, entitled "Self-Propelled Implement Assemblies" and of common assignment with the present invention. It is not necessary for a proper understanding of the present invention to discuss all the details of the transport vehicle 10 as described in the referenced application. It is sufficient to say, however, that the vehicle 10 has fore-and-aft support brackets 12, 14 on an axle assembly 16 and a motor housing 18, respectively. The vehicle 10 additionally has support brackets 20 connected to and on the underside of the axle assembly 16.

The support brackets 12, 14 receive a horizontal rigid frame 22 having longitudinal side frames 23, 24, fore-and-aft frames 25, 26, and cross frames 28. The aft portion of the frame 22 is detachably mounted to the support bracket 20 and the forward end of the frame 22 is detachably secured to the support brackets by suitable means. The forward ends of the longitudinal side frames 23, 24 extend beyond the axle support bracket 12 and forward of the axle assembly 16. As shown in FIG. 3, a pair of U-shaped brackets 30, 31 are secured to the forward ends of the frames 23, 24. The brackets 30, 31 are positioned so that their open end is in a forward direction and that they are in a horizontal alignment. The brackets 30, 31 receive a transverse mounting frame 32 which is held in the brackets 30 by locking pins 34.

A second transverse mounting frame 36 is parallel to and positioned beneath the first mounting frame 32. The frame 36 is held within a pair of forwardly facing U-shaped brackets 38 by locking pins 40. The lower U-shaped brackets 38 are mounted on arms 42 which are suitably detachably secured to support brackets 20.

The mounting frames 36 and 32 provide a support for a pair of spaced parallel lifting linkages 45, 46. Each of the linkages 45, 46 comprises a rear vertical link 48 detachably secured to the mounting members 32 and 36 by U-bolt assemblies 50, 52. A pair of upper and lower links 54, 56, respectively, are pivotally connected to the upper and lower ends of the link 48. The links 54, 56 are parallel to one another and extend in a forward direction to a pivotal connection with a forward vertical link 58. Therefore, the vertical link 58 is displaceable relative to the rear link 48 but is always maintained in parallel relationship.

The linkages 45, 46 are each displaced by means of actuators 60 (only one of which is shown), suitably detachably connected at one end to the vertical post 48 and detachably secured to an actuating link 64. The actuator receives a supply of hydraulic fluid from the vehicle 10 via a suitable flexible supply line. The actuating link 64 is pivotally connected at an intermediate point 70 to a web 68, secured to the upper link 54. The end of the actuating link opposite the end which is connected to the actuator 60 is pivotally connected to a second actuating link 72 at one end thereof. The opposite end of link 72 is pivotally connected to the lower link 56 at joint 74. Since the link 72 is secured adjacent the mounting for link 56, it substantially acts as a fulcrum for link 64. Thus, the actuator 60 is given a mechanical advantage because it is acting at radius further from the fulcrum than the element being lifted, or pivot 70 of web 68.

The forward vertical link 58 provides a mounting for a transverse main tool bar 76. The transverse tool bar 76 is secured to the vertical link 58 of each set of parallel links by brackets 78. Each of the brackets 78 comprise a rigid vertical post 80 having a groove 82 in the upper end and having a recess 84 to receive the aft end of the tool bar 76. A corresponding bracket 86 includes a rigid post horizontally extending from the tool bar 76. The bracket 86 has a recess 88 for receiving the forward end of the tool bar and another recess 90 in the forward end thereof. The brackets 78 and the tool bar 76 are mounted against the post 58 by bolt assemblies 92.

As shown in FIG. 4, the tool bar 76 is stiffened in a vertical direction by an upper truss rod 94 which is slidably received in the grooves 82 of the vertical posts 80 and is secured adjacent the end of the main tool bar 76 by bolting to a detachably secured hinge plate 96. Additional stiffening in a horizontal plane is achieved by a forward truss rod 98 slidably received in grooves 90 and secured to the opposite ends of the tool bar 76 by bolting to the forward portion of the hinge plate 96.

When it is desired to traverse a large number of rows in a field, the main tool bar 76 has its effective length increased by a pair of auxiliary tool bars 100 which are secured to plates 102 vertically pivotally mounted to hinge plates 96 at the forward end thereof. With such an arrangement, the auxiliary tool bars 100 are pivoted to a transport position, as shown in FIG. 2, wherein the free ends of the bars 100 are received in U-shaped brackets 104 integral with post 86. Locking pins 107 provide a detachable locking of the auxiliary tool bars 100 in the bracket 104. The auxiliary tool bars 100 are also pivoted into an operating extended position so that the tool bars 100 form an extension of the main tool bar 76, as shown in FIGS. 4 and 5. The auxiliary tool bars 100 are stiffened by upper truss rods 105 and forward truss rods 106. The truss rods 105 and 106 are bolted at one end of the rigid hinge plates 102 and at the other end to a bracket 108 secured to the free end of the bars 100.

The tool bar 76 is lowered and raised between operating and transport positions by means of the hydraulic actuators 60 and the associated lifting linkages 46. When the tool bar 76 is in an operating position where implements engage the field over which the vehicle 10 is traversing, it is frequently necessary to have the tool bar positioned at a given height above the field. For this purpose the actuators 60 are of a one-way type in which they only apply a force in the extended direction. Therefore, the tool bar 76 may be supported by a pair of gauge wheel assemblies 110, including wheels 114, adjustably secured to the tool bar 76 by U-bolt assemblies 112. The wheel assemblies have a suitable means for adjusting the height of the wheel 114 relative to the bar 76.

With the above implement-carrying assembly, implements may be conveniently supported for diverse row spacings in the manner described below. With particular reference to FIG. 5, the implement-carrying assembly is set up for 4-inch row spacings, each row being indicated by the reference letter R. For this arrangement the parallel lifting links 46 are adjusted to the outer ends of the transverse mounting frames 32 and 36. The corresponding mounting brackets on the forward end of the linkage 46 are then adjusted along the length of the tool bar 76 to be in line with the aft vertical post 48. It should be noted that since the truss rods 94 and 98 are slidably received in the vertical and horizontal posts 80 and 86, the stiffness of the tool bar 76 is maintained irrespective of the position of the posts 58 relative to the tool bar 76. With the linkages 46 in the given position the tool bar 76 may be adjusted laterally relative to the mounting brackets 78 so that the centerline for each of the rows R falls between the various mounting brackets, hinges and gauge wheel assemblies positioned along the length of the tool bar.

When it is desired to provide a different row spacing arrangement, the implement-carrying assembly may quickly be adjusted to the position shown in FIG. 6. In this FIG., the implement-carrying assembly is set up for six rows with a row spacing of 30 inches. The centerline of the rows are each indicated by reference numeral r. For this condition the left parallel link 45 is mounted on the bars 32 and 36 adjacent the outer side of the bracket 30. The right parallel linkage 46 is mounted to the frames 32 and 36 adjacent the inner side of bracket 31. Since the overall length of the six rows is substantially reduced from the configuration shown in FIG. 5, it is only necessary to provide one auxiliary tool bar 100. To achieve this, the opposite hinge plate 96 and 102 and the corresponding auxiliary tool bar 100 are detached from the end of the main tool bar 76. The truss rods 94 and 98 are then secured to the end of the tool bar 76 by a suitable bracket 118. Again the tool bar 76 is laterally adjusted relative to the brackets 78 to make sure that the centerline of each row r is in between the lifting linkages, gauge wheels and the hinge mounted on the tool-carrying assembly.

The above adjustable implement-carrying assembly provides a rapid and effective adjustment of row spacings between implements carried thereby. Furthermore, the tool bar is stiffened irrespective of the position of the tool bar relative to its supporting elements. It should also be noted that since the hydraulic actuators have a flexible hydraulic connection to the vehicle 10, the vertical links are free to be moved anywhere along the transverse mounting frames 32 and 36 except at the point where the mounting members secure to the frame 22.

It should also be noted that since the actuators 60 and their associated actuating linkage are contained within the plane of the linkages, a minimum of width is taken up to permit a closer mounting of an implement to the parallel links 46. It should be noted also that the actuating linkage associated with the actuator provides a significant mechanical advantage to the actuator within the confines of the linkage.

What is claimed as novel and desired to be secured by Letters Patent of the United States is:

We claim:

1. Apparatus comprising:
   a vehicle adapted for transport across a field;
   an elongated, structural, transverse bar extending laterally beyond the width of said transport vehicle;
   a pair of lift linkages laterally adjustably secured to said vehicle;
   means secured to said spaced lift linkages for laterally adjustably mounting said transverse bar, said mounting means including at least one vertical rigid post having means in the upper end for forming a transverse guide;
   a longitudinal truss rod positioned above said transverse bar and being received in the guide of said vertical post;
   means for securing the ends of said upper truss rod adjacent the ends of said transverse bar;
   whereby said transverse bar is stiffened in a vertical plane irrespective of the position of said transverse bar relative to said mounting means.

2. An implement-carrying assembly as in claim 1 further comprising:
   at least one rigid post horizontally extending from said mounting means and having means in the outer end thereof for forming a guide;
   a second longitudinal truss rod positioned forward of said transverse bar and being slidably received in the guide of said horizontal post;
   means for securing the outer ends of said forward tie rod to said transverse bar;
   whereby said transverse bar is strengthened against bending in an aft direction irrespective of the position of said transverse bar relative to the adjustable mounting means on said vehicle.

3. An implement-carrying assembly as in claim 2 wherein:
   said vehicle adjustable supporting means comprises a pair of articulated linkages laterally spaced from one another;

said mounting means for said bar comprises a pair of brackets respectively secured to said linkages, each bracket having a vertical and forward post positioned so that said truss rods are slidably received in the guides on both of said mounting means.

4. An implement-carrying assembly as in claim 3 and adapted to traverse an extremely wide path, said implement-carrying assembly further comprising:
a pair of hinges secured to the opposite outer ends of said transverse bar, each of said hinges being formed from two plates, the first of which is secured to the end of said transverse bar and the second of which is pivotal about a vertical axis relative to the transverse bar;
auxiliary transverse bars secured to said second hinge plates so that when said hinge plates are pivoted to abut one another said auxiliary transverse bars form extensions of the main transverse bar, said hinged plates being pivoted to one another at the forward end thereof so that said implement-carrying members may be swung to a transport position generally parallel to and forward of said main implement-carrying member; and
means integral with the horizontally extending guide posts for said forward truss rod for detachably receiving the outer ends of said auxiliary transverse bars when said bars are in a transport position.

5. An implement-carrying assembly as in claim 4 further comprising:
a pair of truss rods positioned above and forward of each auxiliary transverse bar;
means for securing said last-mentioned truss rods to said second hinge plate and the face ends of said auxiliary transverse bars thereby stiffening said auxiliary transverse bars, said first-mentioned truss rods being secured to said first hinge plate.

6. An implement-carrying assembly as in claim 5 further comprising a pair of wheel means laterally adjustably mounted on said main transverse bar, said wheels also being adjustably positioned in a vertical direction for maintaining said transverse bar at a given distance above the field over which said vehicle travels.

7. Apparatus as in claim 11 wherein said lift linkages each comprise:
first and second vertical links and upper and lower links parallel to one another and pivotally connected to said vertical links;
a hydraulic actuator mounted within the plane of said parallel linkage and having a source of hydraulic fluid supplied from the transport vehicle via a flexible connection;
means for detachably connecting one end of said actuator to said first vertical post;
a web secured to said upper link;
a first actuating link pivotally mounted on said web;
means for detachably connecting one end of said first actuating link to the other end of said actuator, the opposite end of said first actuating link extending for a greater distance than the first-mentioned end from the pivotal mounting on said web;
a second actuating link pivotally connected to said lower link adjacent its connection to said first vertical link and pivotally connected to the said opposite end of said first actuating link;
whereby the mechanical advantage of said hydraulic actuator is magnified.

PO-1050
(5/69)

UNITED STATES PATENT OFFICE
CERTIFICATE OF CORRECTION

Patent No. 3,578,089        Dated May 11, 1971

Inventor(s) RONALD J. FISCHER ET AL

It is certified that error appears in the above-identified patent and that said Letters Patent are hereby corrected as shown below:

Col. 3, line 60, "4-inch" should read -- forty inch -- .

Col. 6, line 1, "transverse" should be deleted;

Col. 6, line 9, "claim 11" should read -- claim 1 -- .

Signed and sealed this 24th day of August 1971.

(SEAL)
Attest:

EDWARD M. FLETCHER, JR.
Attesting Officer

WILLIAM E. SCHUYLER, JR.
Commissioner of Patents